US012689628B2

(12) United States Patent
Refua

(10) Patent No.: US 12,689,628 B2
(45) Date of Patent: **\*Jul. 21, 2026**

(54) DYNAMIC VIRTUAL IDENTIFIER GENERATION FOR USER INTERACTION AUTHORIZATION VERIFICATION AND LOGGING

(71) Applicant: Navan, Inc., Palo Alto, CA (US)

(72) Inventor: Yuval Refua, Sunnyvale, CA (US)

(73) Assignee: Navan, Inc., Palo Alto, CA (US)

( \* ) Notice: Subject to any disclaimer, the term of this patent is extended or adjusted under 35 U.S.C. 154(b) by 81 days.

This patent is subject to a terminal disclaimer.

(21) Appl. No.: 18/416,635

(22) Filed: Jan. 18, 2024

(65) Prior Publication Data

US 2024/0241931 A1 Jul. 18, 2024

Related U.S. Application Data

(60) Provisional application No. 63/480,505, filed on Jan. 18, 2023.

(51) Int. Cl.
*H04L 9/40* (2022.01)
*G06F 21/31* (2013.01)

(52) U.S. Cl.
CPC ............ *H04L 63/102* (2013.01); *G06F 21/31* (2013.01)

(58) Field of Classification Search
None
See application file for complete search history.

(56) References Cited

U.S. PATENT DOCUMENTS

| 10,445,739 | B1 * | 10/2019 | Sahni | ................. | G06Q 20/2295 |
| 12,400,196 | B1 * | 8/2025 | Roth | .................. | G06Q 20/0855 |
| 12,423,692 | B2 * | 9/2025 | Stark | .................... | G06V 30/224 |
| 2021/0004912 | A1 * | 1/2021 | Stark | ........................ | G06N 3/09 |

(Continued)

FOREIGN PATENT DOCUMENTS

| CN | 102006583 B | 6/2015 |
| CN | 105681299 A | 6/2016 |

(Continued)

OTHER PUBLICATIONS

PCT International Search Report and Written Opinion, PCT Application No. PCT/US24/12033, Apr. 17, 2024, 13 pages.

(Continued)

*Primary Examiner* — James R Turchen
(74) *Attorney, Agent, or Firm* — Fenwick & West LLP

(57) ABSTRACT

A networked system generates virtual identifiers for network entities to identify interactions of these entities with other entities in the network. These virtual identifiers are generated upon detecting trigger events. Upon the detection of an event that triggers the generation of a virtual identifier, the networked system seeks a virtual identifier from an account management system. This virtual identifier serves as a unique identifier associated with the user but that represents an account that the user is authorized to use. The system associates the virtual identifier with aspects of the triggering event, such as the user linked with the trigger event or the event itself. Consequently, when the system detects an interaction bearing the virtual identifier, the system can associate the interaction with the user who initiated the interaction.

18 Claims, 4 Drawing Sheets

(56)                    References Cited

U.S. PATENT DOCUMENTS

| | | | |
|---|---|---|---|
| 2021/0295452 A1* | 9/2021 | Dutt | G06Q 20/36 |
| 2021/0326877 A1* | 10/2021 | Goodwin | G06Q 20/3672 |
| 2022/0261759 A1* | 8/2022 | Fredericks | G06Q 40/00 |
| 2023/0169512 A1* | 6/2023 | Rendheer | G06N 5/02 |
| | | | 705/44 |
| 2024/0185333 A1* | 6/2024 | Ampomah | G06Q 40/02 |

FOREIGN PATENT DOCUMENTS

| | | | |
|---|---|---|---|
| CN | 119728638 B | 3/2025 | |
| WO | WO-2022079500 A1 * | 4/2022 | G06Q 30/06 |

OTHER PUBLICATIONS

United States Office Action, U.S. Appl. No. 18/416,720, filed Jul. 16, 2025, 7 pages.

* cited by examiner

DYNAMIC VIRTUAL IDENTIFIER GENERATION FOR USER INTERACTION AUTHORIZATION VERIFICATION AND LOGGING

CROSS-REFERENCE TO RELATED APPLICATIONS

This application claims the benefit of U.S. Provisional Application No. 63/480,505, filed Jan. 18, 2023, which is incorporated by reference.

BACKGROUND

Network systems are complex digital ecosystems that encompass a myriad of computing devices, such as servers, workstations, Internet of Things (IoT) gadgets, and mobile devices, all of which interact with one another over a network infrastructure. Both wired and wireless networks are employed to facilitate the seamless communication between these varied components. As a consequence of this interconnectivity, each device continuously generates its own data, culminating in a massive volume of data that warrants meticulous analysis.

Network systems also enable users to interact with one another or with specific systems residing within the network. This interaction could involve information sharing, resource allocation, or communication workflows, among other possibilities. Owing to the diverse and sensitive nature of these activities, certain users may be granted authorization to execute specific actions within the network.

Some network entities give users authorization to perform certain interactions with other entities in the network system on behalf of the network entity. To authorize these users, network entities may associate users with a central account that is managed by an account management system. Such an authorized user can execute interactions within the network system by providing their own identification information and an account identifier associated with the central account. The account management system verifies that the user is authorized and thereby authorizes the user's interactions.

However, where many users are using the account identifier associated with the central account for different interactions, network entities associated with the central account are unable to provide different authorizations to different users. Furthermore, interaction logs describing interactions in the network system are commonly associated interactions with the account identifier used to authorize the interaction. Therefore, interaction logs are commonly ineffective at describing interactions within the network system.

SUMMARY

In accordance with some embodiments, an interaction authorization system generates virtual identifiers for network users to identify interactions of these users with other entities in the network. These virtual identifiers are generated upon detecting trigger events. A trigger event may involve a user requesting access to a specific system resource or initiating an application workflow within the network. Upon detecting a trigger event, the interaction authorization system requests a virtual identifier from an account management system. This virtual identifier serves as a unique identifier associated with the user but that represents an account that the user is authorized to use. For example, without the virtual identifier, the user may normally provide an identifier for an account with which the user is associated. This account identifier authorizes the user to perform certain interactions with other entities within the networked system. When the user has been assigned a virtual identifier, the user uses the virtual identifier rather than the account identifier to authorize their interactions.

An interaction authorization system associates the virtual identifier with aspects of the triggering event, such as the user linked with the trigger event or the event itself. Consequently, when the interaction authorization system detects an interaction bearing the virtual identifier, the interaction authorization system can associate the interaction with the user who initiated the interaction. The interaction authorization system can thereby apply authorization rules to the interaction based on the linked user and interaction. The interaction authorization system also may generate interaction logs that associate a user's interaction with their assigned virtual identifier.

By dynamically employing virtual identifiers, the interaction authorization system can associate users with the authorization privileges of a central account while also performing per-user authorization for interactions that users perform. Furthermore, the interaction authorization system improves interaction logging by generating interaction logs that associate interactions with particular users, rather than solely to the central account used by the users. Thus, the interaction authorization system and its operators can more effectively track user interactions and detect unauthorized interactions.

DETAILED DESCRIPTION

Figure 1:
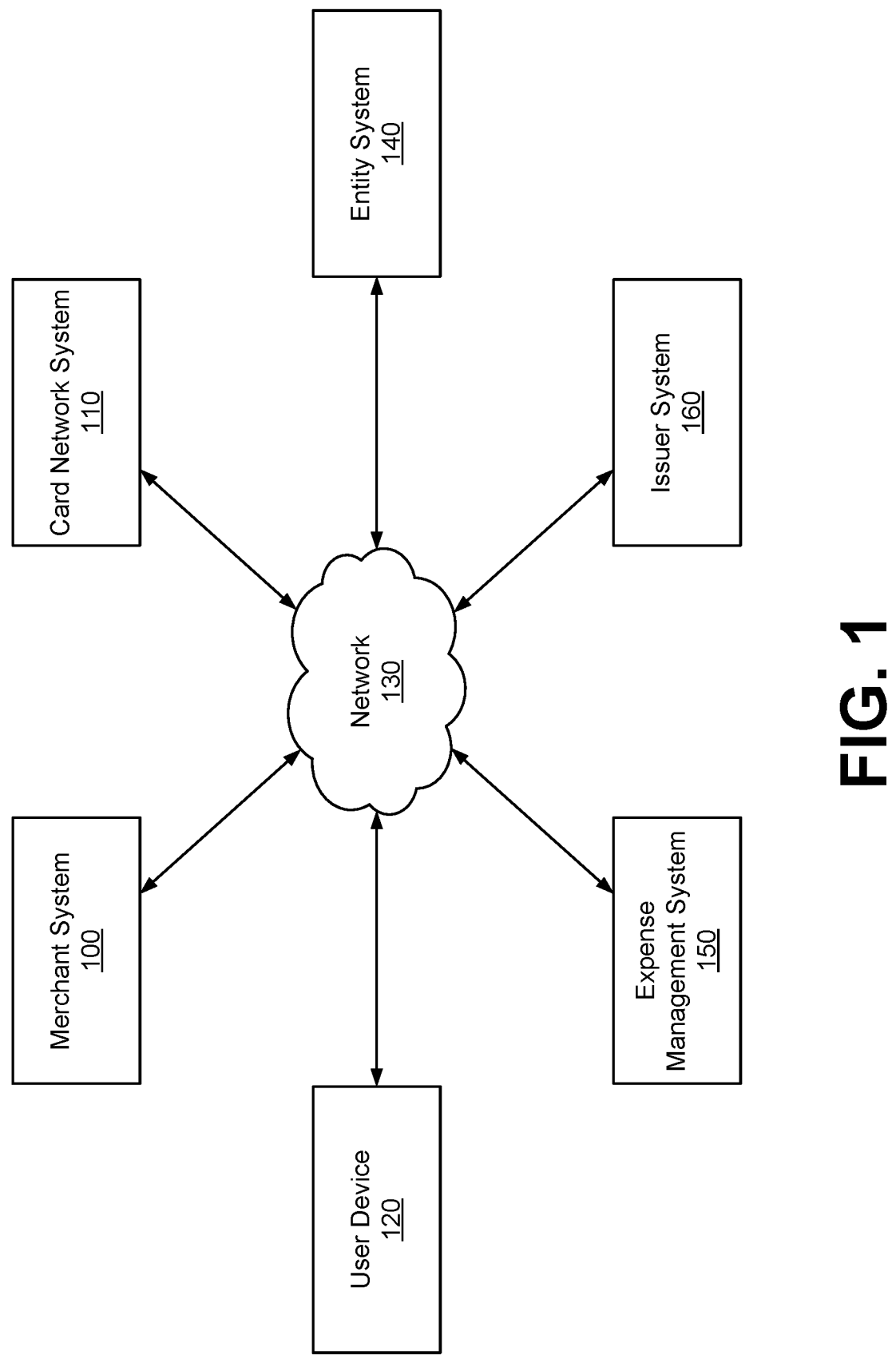
FIG. 1 illustrates an example system environment for an interaction authorization system, in accordance with some embodiments.

In some embodiments, a virtual identifier issued for the central account is a card token issued for a corporate credit card. The interaction authorization system may be an expense management system that enforces expense policies on corporate credit card use by employees of the associated network entity system 140. When the user causes a trigger event (e.g., plans a business trip or a business lunch), the interaction authorization system may request a card token from the account management system. In these embodiments, the account management system may be a card network system. The interaction authorization system associates the card token with the user and the user can use the card token for transactions to place on the corporate credit card. The interaction authorization system receives transaction data from the account management system that specifies the card token used for each transaction. The interaction authorization system can thereby determine which user performed each transaction. The interaction authorization system can thus reconcile transactions placed on a corporate credit card by different users.

In some aspects, the techniques described herein relate to a method including: detecting, by an expense management system, a tokenization event representing an action taken by a user for which the user is likely to incur expenses on a credit card to be reimbursed by an entity associated with the expense management system; transmitting a card token request to a card network system for the credit card based on the tokenization event; receiving a card token from the card network system, wherein the card token is a randomly-generated string of characters for identifying the credit card; associating the card token with the tokenization event in a database; receiving a transaction information describing a transaction for which the credit card was used, wherein the transaction information includes the card token; and associating the transaction with the tokenization event based on the transaction information.

In some aspects, the techniques described herein relate to a method, wherein detecting a tokenization event includes: receiving a user interaction with a user interface of a client application of the expense management system.

In some aspects, the techniques described herein relate to a method, wherein the tokenization event is associated with a business trip.

In some aspects, the techniques described herein relate to a method, wherein the card tokenization request includes a plurality of parameters for the card token.

In some aspects, the techniques described herein relate to a method, wherein the plurality of parameters includes at least one of: a time period during which the card token may be used, restrictions on a type of transaction for which the card token may be used, or restrictions on users who may use the card token.

In some aspects, the techniques described herein relate to a method, further including: detecting another tokenization event associated with the user; and associating the card token with the other tokenization event.

In some aspects, the techniques described herein relate to a method, further including: detecting another tokenization event associated with the user; and transmitting another card token request to the card token system based on the other tokenization event.

In some aspects, the techniques described herein relate to a method, wherein associating the transaction with the tokenization event includes: associating the card token with the user in the database.

In some aspects, the techniques described herein relate to a method, further including: applying expense management rules to the transaction based on the association of the card token with the user in the database.

In some aspects, the techniques described herein relate to a method, further including: generating a transaction report including the transaction, wherein the transaction report associates the transaction with the tokenization event.

In some aspects, the techniques described herein relate to a method including: detecting, by an interaction authorization system, a trigger event representing an action taken by a user, wherein the user is associated with a central account of a networked entity; responsive to detecting the trigger event, transmitting a virtual identifier request to an account management system for the central account based on the trigger event; receiving a virtual identifier from the account management system, wherein the virtual identifier includes a string of characters for identifying the central account of the networked entity; associating the virtual identifier with the trigger event in a database; receiving interaction information describing an interaction for which the central account was used to authorize the interaction, wherein the interaction information includes the virtual identifier; associating the interaction with the trigger event based on the interaction information; and generating an interaction log describing the interaction, wherein the interaction log associates the interaction with the trigger event.

In some aspects, the techniques described herein relate to a non-transitory computer-readable medium storing instructions that, when executed by a processor, cause the processor to perform operations comprising any or all of the methods described above. Additionally, the techniques described herein relate to a system comprising a processor and the non-transitory computer-readable medium previously described.

Brief Overview of Example Embodiment

The management by a company of business-related expenses incurred by its employees is a difficult, time-consuming, and expensive process, especially for large organizations or companies where users may do many different types of business-related spending, or where the business expenses tend to be complex. One example is for companies where the employees travel frequently, and so there are a multitude of travel expenses in addition to other corporate expenditures. Typically, business expenses are (1) either paid by the employee and submitted for reimbursement later or (2) charged to a specific company-managed credit card or to a few common company cards that bear most of the expenses for the entire company across many categories of expenses.

In the latter situation, corporate credit cards may be issued to an individual user within a company, and depending on company policy, the cards may be used for multiple different types of purchases, and sometimes for numerous uses. For example, employees may use the cards for expenditures related to a company party, for business lunches, or to purchase travel bookings across multiple employees and multiple trips. This leads to a long list of transactions that require significant time and effort to untangle, attribute, and categorize at the end of each statement period, in a reconciliation process that is generally required by companies' accounting policies.

This reconciliation process is made more difficult because transactions incurred on a corporate credit card by different users often appear with very similar descriptions or with descriptions that do not disambiguate between users or expense events. For example, a transaction for a business lunch may only list the restaurant name, the date of the transaction, and the total cost of the meal. Thus, a business cannot easily identify the employee who incurred the cost and determine whether the transaction is in compliance with the business's expense policies.

An expense management system dynamically generates card tokens for a corporate credit card to improve the transaction reconciliation process. The expense management system generates card tokens for a credit card when the system detects tokenization events. These tokenization events are actions taken by users for which a user is likely to incur expenses on the credit card to be reimbursed by the business associated with the credit card. For example, a tokenization event may be a user scheduling a business trip, a user attending a business meal, or a user organizing an office event. This tokenization system works for any type of credit card issued by any issuing bank associated with a credit card company (e.g., a Visa card issued by Chase bank, a Mastercard issued by Citibank, etc.).

When the expense management system detects a tokenization event, the expense management system requests a card token for the credit card from a card network system. A card token is an identifier (e.g., a unique identifier), such as a randomly-generated string of characters that can be used as a replacement identifier for the credit card without using the credit card's identifier (e.g., credit card number) directly. It can be based in some manner on the credit card number, or can be a completely independent number that is then associated with the credit card.

The expense management system associates the card token with one or more parts of the transaction, such as the user associated with the corresponding tokenization event, or with the event itself (e.g., a business trip) or a subevent or component of an event (e.g., or a plane flight associated with a business trip). Thus, when the expense management system receives a transaction that specifies that a card token was used for the transaction, the expense management system can associate the transaction with the user that incurred the expense, or with the particular transaction or tokenization event or subevent or component of the event. The expense management system can then apply expense policies to the transaction based on the user (and/or event/subevent) associated with the transaction. In some embodiments, a company can register or otherwise link its existing corporate credit card with the expense management system, and simply continue to use this card going forward, but the expense management system will now generate tokens for users and/or tokenization events or transactions related to the card, thus greatly simplifying reconciliation of different transactions by different users. In other embodiments, a user can register or otherwise link a user's personal credit card (e.g., personal Visa, Amex, Mastercard, etc.) with the expense management system, and similarly the system can generate tokens for business expenses.

By using card tokens to associate users with transactions, the expense management system automates the process of reconciling a set of transactions incurred by different users on the same corporate credit card. These techniques can dramatically reduce the amount of human labor required to identify which transactions may be covered by a business's expense policies. Additionally, the expense management system can reconcile transactions that a user incurs on a corporate credit card without the user having to manually identify their transactions, thereby improving the user's experience with the expense management system.

System Environment

FIG. 1 illustrates an example system environment for an expense management system 150, in accordance with some embodiments. The system environment illustrated in FIG. 1 includes a merchant system 100, a card network system 110, a user device 120, a network 130, an entity system 140, an expense management system 150, and an issuer system 160. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

The merchant system 100 is a computing system that receives credit card payment information from a user or cardholder for a transaction between a merchant and the user. The merchant system 100 also requests payment to the merchant for the transaction from the issuer system 160 via the card network system 110. Specifically, in a typical example of a credit card environment, the user's card details are sent from the merchant to a bank associated with the merchant (e.g., the acquiring bank or merchant's bank), which forwards those details to the card network system 110 (e.g., Visa, Mastercard, American Express, or Discover), which clears the payment and requests payment authorization from the issuer system 160 (e.g., the credit card issuing bank, or the bank that issued the credit card to the user). The payment information received by the merchant system 100 may include an identifier for a credit card account with the issuer to be used for paying for the transaction. For example, the payment information may include one or more of the following: a credit card number, a card verification value, an expiration date, a name associated with the credit card account, a billing address, a card security code, a payment amount, among other details. For simplicity, the description herein will focus primarily on embodiments using a credit card for payment to a merchant. However, other payment methods may be used in these or other embodiments.

In some embodiments, the merchant system 100 receives a card token that represents a credit card used by a user. The merchant system 100 may use the card token as a replacement for a credit card identifier that a user may otherwise provide to complete a transaction. Card tokens are described in further detail below.

The card network system 110 is a computing system that facilitates payments from users to merchants through credit cards. Examples of card network systems 110 include systems with networks that process credit card payments worldwide and govern interchange fees, such as Visa, Mastercard, American Express, and Discover. The card network system 110 includes hardware systems that receive and transmit transaction information, and includes software systems that process transactions and ensure the validity of the transactions. Transaction information is information that describes a transaction between the user and the merchant. For example, transaction information may include a payment amount, time, currency, credit card number, the payment information from the credit card, a merchant identifier, or a merchant category.

The card network system 110 may provide transaction information for a transaction to the issuer system 160 for the issuer system 160 to approve. If the issuer system 160 approves the transaction, the card network system 110 coordinates the payment from the user's account at the issuer to a merchant's account at another institution (e.g., an acquiring bank). The card network system 110 may enforce domain control rules for credit cards, which are constraints on how a user can use their credit card. The card network system 110 may also notify entities that are third-parties to a transaction of the details of a transaction.

A user can interact with other systems through a user device 120. The user device 120 can be a personal or mobile computing device, such as a smartphone, a tablet, a laptop computer, or desktop computer. In some embodiments, the user device 120 executes a client application that uses an application programming interface (API) to communicate with other systems through the network 130.

The user corresponding to the user device 120 may be assigned a corporate credit card by the entity corresponding to the entity system 140. The corporate credit card is a credit card that is issued by the issuer to the user associated with the entity or that is issued to the entity to be used by the user. For example, the user may be an employee of the entity (e.g., a corporation, company, or organization) and the user may use the credit card to purchase goods and services on behalf of the entity. However, the entity may have one or more expense policies that restrict or define specific parameters around the goods or services that the user can purchase using the card. For example, the expense policy may limit from which merchants the user may purchase goods or services, when the user may use the credit card, or in which geographic locations or areas the user may use the credit card.

The user device 120 receives policy results for the user's transactions that were processed by the expense management system 150. These policy results indicate whether the user's transaction was covered by the entity's expense policy. These results can be received in real-time or near real-time. For example, the user device 120 can be notified on a mobile application or via another notification mechanism at the point of sale (e.g., during or after the user has swiped the credit card at the merchant) certain details about the transactions. For example, the user may be notified that the transaction has been approved or denied, the notification may specify certain details around the policy that will be violated by the transaction (e.g., the transaction will exceed the policy limit for that particular type of purchase or that type of merchant). In some embodiments, the transaction proceeds even if it violates an expense policy. If the user's transaction proceeded but was not covered by the entity's expense policy, the policy results may further indicate that the user must reimburse the entity for the transaction. In other embodiments, the transaction is blocked or prevented based on the violation of the entity's expense policy. In this example, the user may receive a notification as to why the transaction is not going through, and may modify the transaction (e.g., reduce the amount being spent such that it falls under an expense policy limit, or purchase a different item that falls under the policy requirements, etc.).

The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. Similarly, the network 130 may use phone lines for communications. The network 130 may transmit encrypted or unencrypted data.

The entity system 140 is a computing system operated by an entity. The entity may be a business, organization, or government, and the user may be an agent or employee of the entity. The entity system 140 provides an interface to other employees of the entity (e.g., expense administrators, accounts team members, etc.) to specify expense policies for the user's corporate credit card, and transmits the expense policies to the expense management system 150. The entity system 140 also may receive policy results from the expense management system 150 that indicate whether a user's transaction is covered by the expense policies set by the entity. These policy results can be presented in an interface to, for example, expense administrators or accounts team members that manage adherence to those policies. These policy results may also indicate whether the entity system 140 is reimbursed by the user or whether the entity system 140 reimburses the user. While the entity system 140 is primarily described herein as being separate from the expense management system 150, the entity system 140 may perform some or all of the functionality of the expense management system 150. In some embodiments, the expense management system 150 is provided by another party, and the entity subscribes to the expense management system 150 through that other party so that the entity is able to use the system 150 to dynamically manage its expenses. In other embodiments, another party may provide software that the entity can purchase or use to provide the expense management system 150 functionality within the entity system 140.

The expense management system 150 is a computing system that manages expenses incurred for an entity by users. The expense management system 150 receives expense policies from the entity system 140, which constrain or define limits or parameters around the transactions that a user may expense to the entity using their corporate credit card from the entity. For example, the expense policies may include a per diem, a lodging budget, a rail travel budget, a flight budget, limitations on merchants or merchant categories at which the credit card can be used, or limitations on geographic regions or locations in which the card can be used. The expense management system 150 receives transaction information from the card network system 110 and determines whether the transaction described by the transaction information complies with the expense policies from the entity system 140. The expense management system 150 transmits policy results to the user through the user device 120 and to the entity through the entity system 140. These results indicate whether a transaction complies with the expense policies of the entity. If the transaction does not comply with the expense policy, the expense management system 150 may approve or reject the transaction, ask for additional information about the transaction (e.g., request that the user take a photo of a receipt for the transaction, request that the user provide a note describing the transaction or a purpose of the transaction, request that the user identify other users that were associated with the transaction), transmit a request to the user device 120 for the user to reimburse the entity for the transaction, allow the user to contest the approval or rejection, only provide a partial reimbursement, among other possibilities.

The expense management system 150 also may generate card tokens for detected tokenization events to improve transaction reconciliation on a corporate credit card. For example, the expense management system 150 may detect when a user performs an action for which the user is likely to incur expenses on a corporate credit card to be reimbursed by the entity. When the expense management system 150 detects these tokenization events, the expense management system 150 may request a new card token from the card network system 110 to reconcile transactions that users put on a corporate credit card. An expense management system's use of card tokens to reconcile transactions is described in further detail below.

The issuer system 160 is a computing system for an issuer of the user's credit card. The issuer may be an entity that issues a line of credit for the user or for the entity to use for the credit card. The issuer system 160 receives transaction information from the card network system 110 and may approve or reject payments to the merchant for the transaction.

Example Method for Dynamic Credit Card Tokenization

Figure 2:
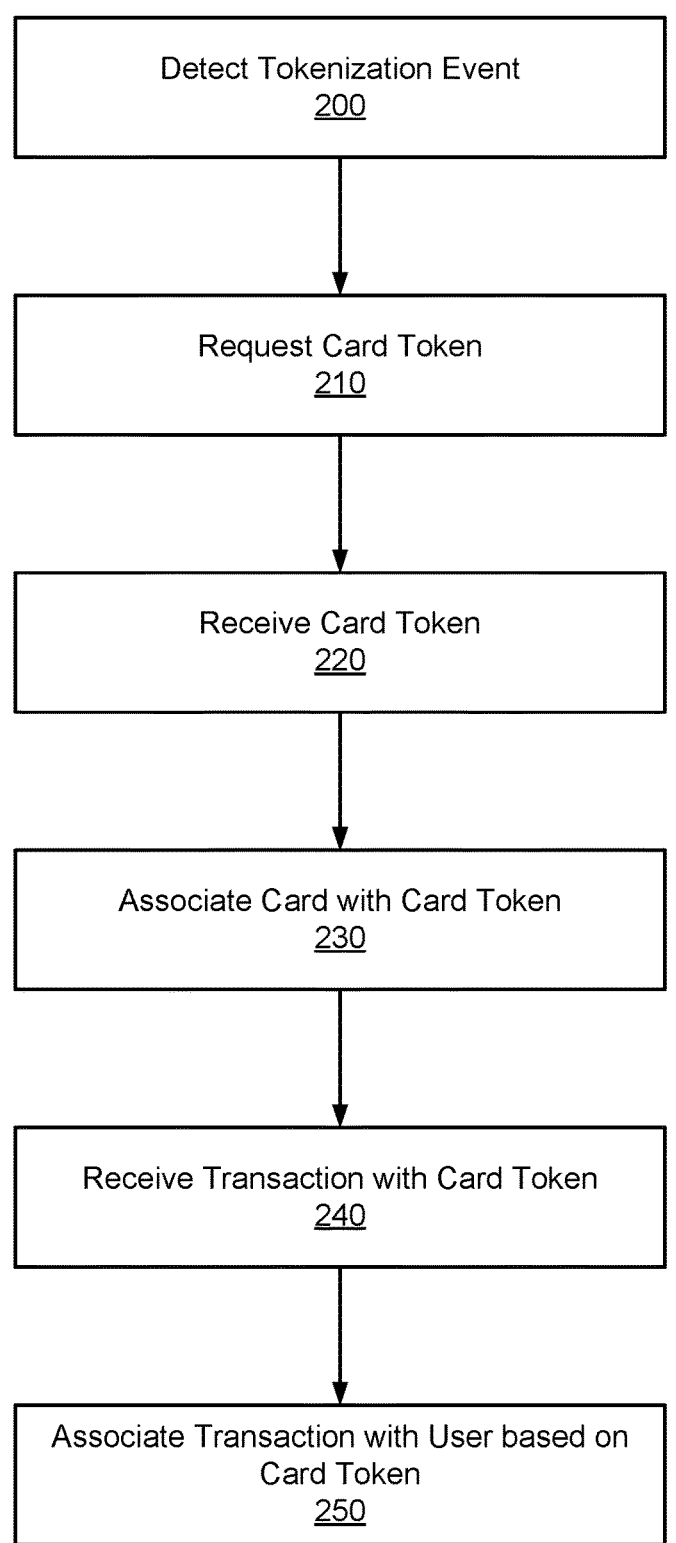
FIG. 2 is a flowchart for a method of dynamic virtual identifier generation, in accordance with some embodiments.

FIG. 2 is a flowchart for a method of dynamic credit card tokenization, in accordance with some embodiments. Alternative embodiments may include more, fewer, or different steps from those illustrated in FIG. 2, and the steps may be performed by an expense management system (e.g., expense management system 150) or a different system. Additionally, each step may be performed automatically by an expense management system without human intervention.

The expense management system detects 200 a tokenization event. A tokenization event represents an action taken by a user for which the user is likely to incur expenses on a corporate credit card to be reimbursed by the entity associated with the corporate credit card. For example, tokenization events may be generated when a user schedules a work trip or a work meal using the expense management system, when a user books a hotel or a flight, when the user schedules a ride share, or when the user purchases something using the corporate credit card. Tokenization events may include a time period during which a user is expected to incur reimbursable expenses. For example, if the tokenization event is a work trip that the user is taking, the tokenization event may include a time period that starts when the user leaves for the work trip and ends when the user returns from the work trip.

The expense management system may receive tokenization events from user devices or entity devices. For example, when a user uses a user device to take an action that would cause a tokenization event, the user device may generate a tokenization event and transmit it to the expense management system. In this instance, the detection 200 of the tokenization event occurs when the user device (or entity device) notifies the expense management system of a tokenization event or requests creation of a token. The expense management system may itself detect and may generate tokenization events. For example, the expense management system may receive calendar data or location data for users and determine that the users are likely to incur reimbursable expenses during a time period. The detection 200 of the tokenization event may occur automatically by the expense management system, such that it detects that there is a tokenization event without further user interaction or explicit notification to the expense management system that such an event will be occurring.

In some embodiments, the expense management system detects a tokenization event when a user performs an application workflow through the user device. For example, the expense management system may provide a client application that operates on the user device. The client application may allow a user to perform transactions using the entity's corporate credit card. For example, the client application may allow the user to book flights or hotels or make restaurant reservations. The expense management system may detect a tokenization event when the user starts an application workflow through the client application.

In response to detecting the token event, the expense management system requests 210 a card token from a card network system for the corporate credit card. A card token is an identifier, such as a unique identifier (e.g., a randomly-generated string), that can be used as a replacement identifier for a credit card without using the credit card's identifier (e.g., credit card number) itself. But the card token may be used by the expense management system as a unique identifier not just for the credit card, but also for a particular user using the card for a transaction, or may also be a unique identifier of the transaction itself or to a collection of transactions related to an event.

In some embodiments, the expense management system requests a single card token for multiple tokenization events. For example, the expense management system may use a card token for all expenses on a user's work trip (e.g., for the flight, hotel, meals, and taxis). The expense management system also may request a single card token for each token event, even if those token events correspond to the same work trip. For example, the expense management system may request a different card token for the user's flight as for the user's hotel on the same work trip.

Where the expense management system uses the card token as an identifier for a user, it allows an entity to identify that particular user's transactions amongst other users' transactions on the same credit card. The same token may always be used for the same user. However, the card token may also be linked to a tokenization event or transaction event (e.g., a business trip to London). In this case, the expense management system uses the card token as an identifier for all expenses related to that tokenization event (e.g., flights to/from London, meals while in London, hotels in London, etc.). In another example, the card token might identify both the user and the tokenization event, so it is clear that it is a particular user's event (e.g., User X's business trip to London). In this example, the particular user's trip to a particular destination is easily identified for reimbursement separate from charges on the card for other user's trips to that same destination (or other destinations). In a further example, the card token may be used as an identifier for specific transactions or groups of transactions related to a tokenization event. For example, if a user will take a business trip to London, the expense management system may issue one token for the plane flight purchase to/from London, but may issue a second token for expenses by that user during the London trip (e.g., business meals and hotels), or may issue a new token for each category of expense (e.g., token for meals, token for hotels). It may also allow an entity to disambiguate different transactions from one another by the same user. As a further example, if there is a particular sub-event within a tokenization event (e.g., a conference that the user is attending in London), there may be a card token specific to all expenses related to that sub-event in addition to one or more tokens for the trip itself. The examples in this paragraph relate to business travel, but a corporate credit card used by multiple users (or even by a single user) may have a variety of business expenses charged to it, including business trips, company holiday parties, birthday events, team building activities, mentoring meals with colleagues, client meeting expenses, etc. Card tokens may be issued for any of these types of events and transactions occurring associated with these events. The tokens allow the entity to easily separate and identify each charge on the card, link them to the relevant users and the relevant events and/or transactions. This makes the reconciliation process much simpler and allows users to be reimbursed more quickly for expenses that meet entity reimbursement policies.

To allow for the different types of identifier activities that the card token may be used for, the card token request may include parameters for the card token. For example, the card token request may include a time period during which the card token should be active (e.g., the time period of the corresponding tokenization event), restrictions on what kinds of transactions the card token can be used for (e.g., restrictions on merchants or locations for transactions), restrictions on who is allowed to use the card token, restrictions on a maximum balance that the user can incur on the card token, or whether the credit card may be used online. In other cases, the card token request may correspond to the event and the expense management system may itself determine parameters for the card token. In some embodiments, the card token request includes domain control rules that constrain transactions using the card token. For example, these domain control rules may include restrictions on merchant categories for merchants at which the card token can be used, restrictions on time periods during which the card token may be used, blacklisting or whitelisting of merchants, or restrictions on geographic locations or areas within which the card token may be used.

The expense management system receives 220 a card token from the card network system corresponding to the card network for the corporate credit card, and the expense management system associates 230 the corporate credit card with the received card token. For example, the expense management system may associate the corporate credit card with the received card token in a token database that associates credit cards with card tokens. The expense management system may also associate the card token with the user whose action generated the corresponding tokenization event. Thus, the expense management system may associate transactions that occur using the card token to the user associated with the card token.

In some embodiments, where the user triggered the tokenization event through a client application, the expense management system may use the card token for transactions that the user makes using the client application. For example, the expense management system may book a flight, book a hotel, or pay for a restaurant meal using the card token. The expense management system associates these transactions with the tokenization event or the user. Additionally, where additional charges are placed on the corporate card in association with the transaction (e.g., the user upgraded their flight or bought a movie in their hotel room), the merchants place these additional charges using the card token. The expense management system can thereby associate these additional charges with the same tokenization event and user as for the initial transaction.

The expense management system receives 240 transaction information for a transaction for which the corporate credit card was used. For example, if a meal was purchased or items for a corporate event were purchased, and the information about these purchases is transaction information that is received. The transaction information includes the card token as the credit card identifier for the transaction. For example, there may be a card token for the meal that was purchased and a separate token for the items for the corporate event that were purchased. To allow for reimbursement of the appropriate user for a given transaction, the expense management system associates 250 the transaction with the user based on the card token by matching the card token received in the transaction information with the card token associated with user or the card token associated with the tokenization event or transaction. The expense management system may associate the user with the transaction by creating an entry in a transaction database that associates the transaction with the user.

To the extent that there are expense policies to be applied, the expense management system may apply expense policies to the transaction information based on which user is associated with the transaction. For example, the expense management system may determine whether the user has been pre-approved for the transaction or whether the user has exceeded a budget that they were given for the transaction.

The expense management system also may generate a transaction report that includes the received transaction information. The transaction report presents transactions that have been placed on the corporate credit card, including transactions for multiple users. The transaction report may reconcile transactions by organizing the transactions based on users. For example, the expense management system may use the transaction database to determine which transactions are associated with a user, and organizes the transactions presented in the transaction report based on which user each transaction is associated with. In some embodiments, the transaction report is provided for display on an entity system. Certain aspects of the report specific to a user may also be displayed on a user device. In some embodiments, the expense management system provides a dashboard that the entity can use to review transactions as they come in, and reconcile transactions on a regular basis.

Figure 3:
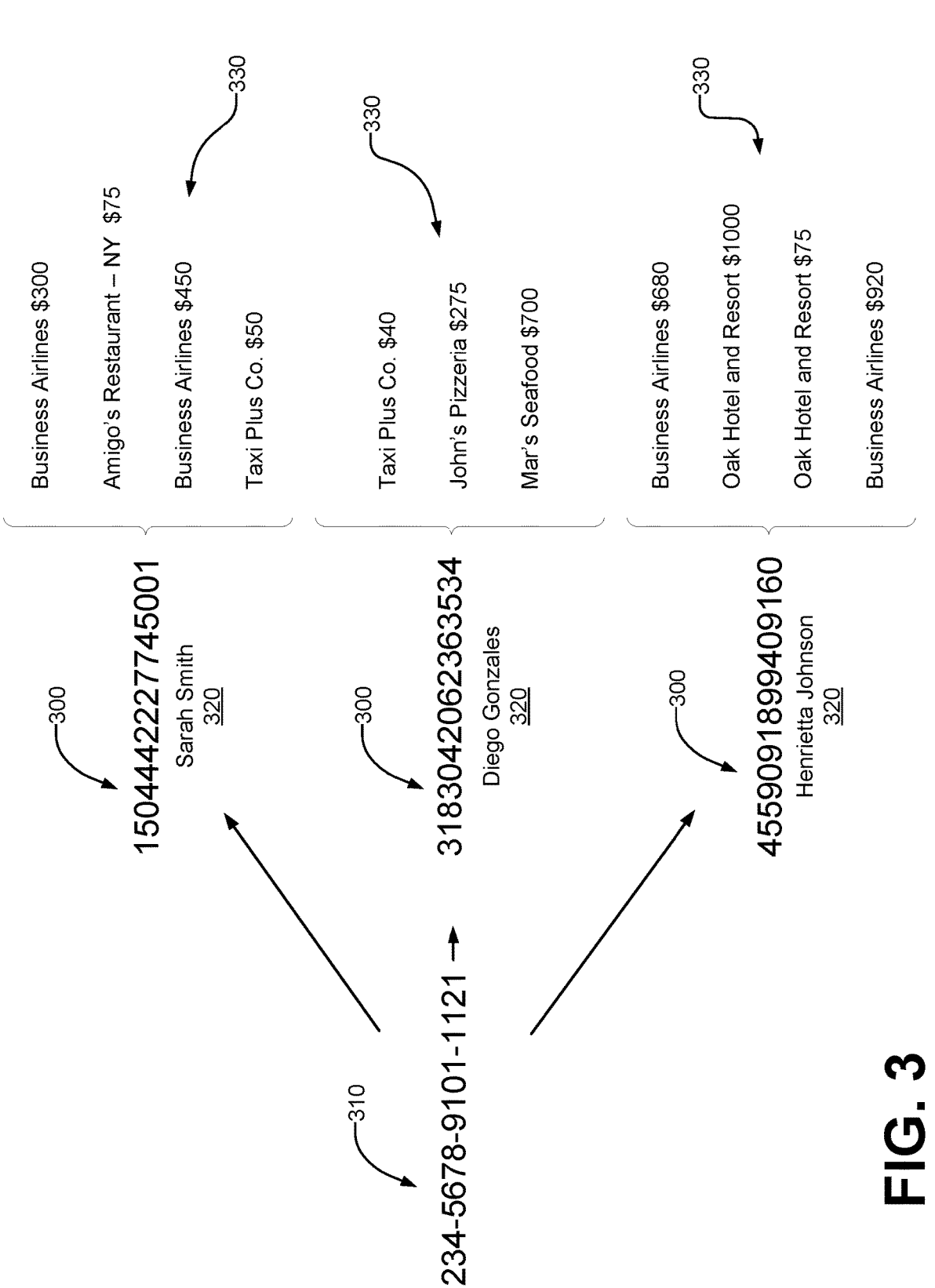
FIG. 3 illustrates an example use of virtual identifiers to reconcile interactions associated with a central account, in accordance with some embodiments.

FIG. 3 illustrates an example use of card tokens to reconcile transactions placed on a corporate credit card, in accordance with some embodiments. An expense management system may generate card tokens 300 for a credit card 310 for different tokenization events. As explained above, each of these card tokens 300 may be associated with a different user 320. When the expense management system receives transaction information for a transaction 330, the transaction information includes the card token 300 used for the transaction 330. Thus, the expense management system can associate each transaction 330 with the user 320 who corresponds to the card token.

Figure 4:
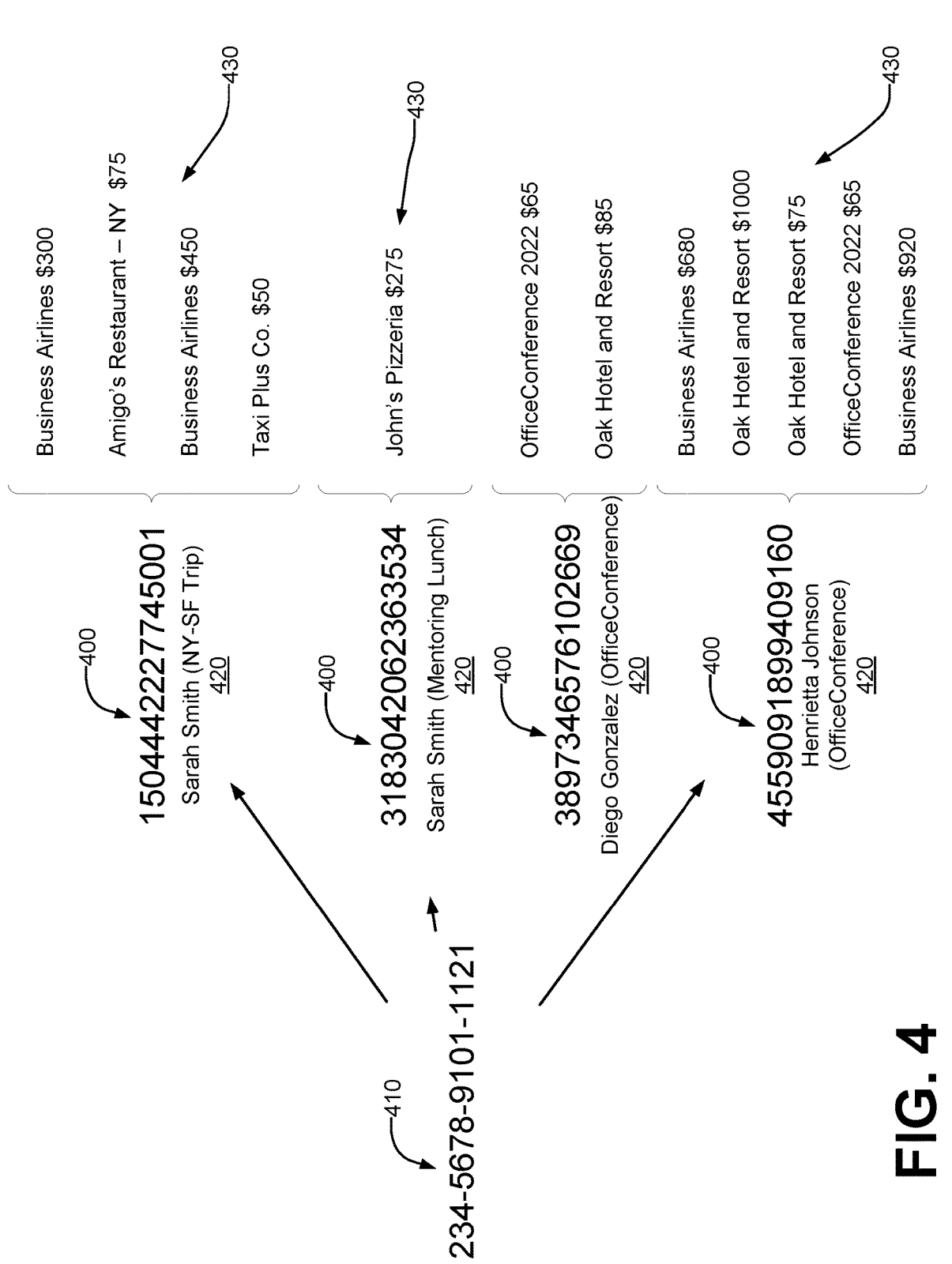
FIG. 4 illustrates another example use of virtual identifiers to reconcile interactions associated with a central account, in accordance with some embodiments.

FIG. 4 illustrates another example use of card tokens to reconcile transactions placed on a corporate credit card, in accordance with some embodiments. Similar to FIG. 3, an expense management system may generate card tokens 400 for a credit card 410 for different tokenization events. In the embodiment illustrated in FIG. 4 however, each of these card tokens 400 is associated with a different tokenization event 420. When the expense management system receives transaction information for a transaction 430, the transaction information include the card token 400 used for the transaction 430. Thus, the expense management system can associate each transaction 430 with the tokenization event 420 to which the transaction 430 corresponds based on the card token used for the tokenization event 420.

FIG. 4 illustrates tokenization events 420 where a user is taking some action that causes the tokenization event (e.g., Sarah Smith attending a mentoring lunch). However, alternative embodiments may simply associate transactions 430 with tokenization events 420 without necessarily associating the transactions 430 with the user who took the action. For example, the expense management system may include all transactions 430 associated with users attending "OfficeConference 2022" with a single OfficeConference tokenization event.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising:

detecting, by an interaction authorization system, a trigger event representing an action taken by a user for which the user will incur expenses on a credit card to be reimbursed by a networked entity associated with the interaction authorization system;

responsive to detecting the trigger event, transmitting, by the interaction authorization system, a card token request to an account management system for the credit card based on the trigger event;

receiving, by the interaction authorization system, a card token from the account management system, wherein the card token comprises a string of characters for identifying the credit card of the networked entity;

associating, by the interaction authorization system, the card token with the trigger event in a database;

receiving, by the interaction authorization system, interaction information describing a transaction for which the credit card was used to authorize the transaction, wherein the interaction information includes the card token;

associating, by the interaction authorization system, the transaction with the trigger event based on the interaction information;

generating, by the interaction authorization system, an interaction log describing the transaction, wherein the interaction log associates the transaction with the trigger event; and applying expense management rules to the transaction based on the association of the card token with the user in the database.

2. The method of claim 1, wherein detecting a trigger event comprises:

receiving a user interaction with a user interface of a client application of the expense management system.

3. The method of claim 1, wherein the trigger event is associated with a business trip.

4. The method of claim 1, wherein the card token request includes a plurality of parameters for the card token.

5. The method of claim 4, wherein the plurality of parameters includes at least one of: a time period during which the card token may be used, restrictions on a type of transaction for which the card token may be used, or restrictions on users who may use the card token.

6. The method of claim 1, further comprising:

detecting another trigger event associated with the user; and associating the card token with the other trigger event.

7. The method of claim 1, further comprising:

detecting another trigger event associated with the user; and transmitting another card token request to the card token system based on the other trigger event.

8. The method of claim 1, wherein associating the transaction with the trigger event comprises:

associating the card token with the user in the database.

9. The method of claim 1, further comprising:

generating a transaction report including the transaction, wherein the transaction report associates the transaction with the trigger event.

10. A non-transitory computer-readable medium storing computer-executable instructions that, when executed, cause a computing system to perform operations comprising:

detecting, by an interaction authorization system, a trigger event representing an action taken by a user for which the user will incur expenses on a credit card to be reimbursed by a networked entity associated with the interaction authorization system;

responsive to detecting the trigger event, transmitting, by the interaction authorization system, a card token request to an account management system for the credit card based on the trigger event;

receiving, by the interaction authorization system, a card token from the account management system, wherein the card token comprises a string of characters for identifying the credit card of the networked entity;

associating, by the interaction authorization system, the card token with the trigger event in a database;

receiving, by the interaction authorization system, interaction information describing a transaction for which the credit card was used to authorize the transaction, wherein the interaction information includes the card token;

associating, by the interaction authorization system, the transaction with the trigger event based on the interaction information;

generating, by the interaction authorization system, an interaction log describing the transaction, wherein the interaction log associates the transaction with the trigger event; and applying expense management rules to the transaction based on the association of the card token with the user in the database.

11. The computer-readable medium of claim 10, wherein detecting a trigger event comprises:

receiving a user interaction with a user interface of a client application of the expense management system.

12. The computer-readable medium of claim 10, wherein the trigger event is associated with a business trip.

13. The computer-readable medium of claim 10, wherein the card token request includes a plurality of parameters for the card token.

14. The computer-readable medium of claim 13, wherein the plurality of parameters includes at least one of: a time period during which the card token may be used, restrictions on a type of transaction for which the card token may be used, or restrictions on users who may use the card token.

15. The computer-readable medium of claim 10, the operations further comprising:

detecting another trigger event associated with the user; and associating the card token with the other trigger event.

16. The computer-readable medium of claim 10, the operations further comprising:

detecting another trigger event associated with the user; and transmitting another card token request to the card token system based on the other trigger event.

17. The computer-readable medium of claim 10, wherein associating the transaction with the trigger event comprises:

associating the card token with the user in the database.

18. The computer-readable medium of claim 10, the operations further comprising:

generating a transaction report including the transaction, wherein the transaction report associates the transaction with the trigger event.

* * * * *